Patented Oct. 1, 1940

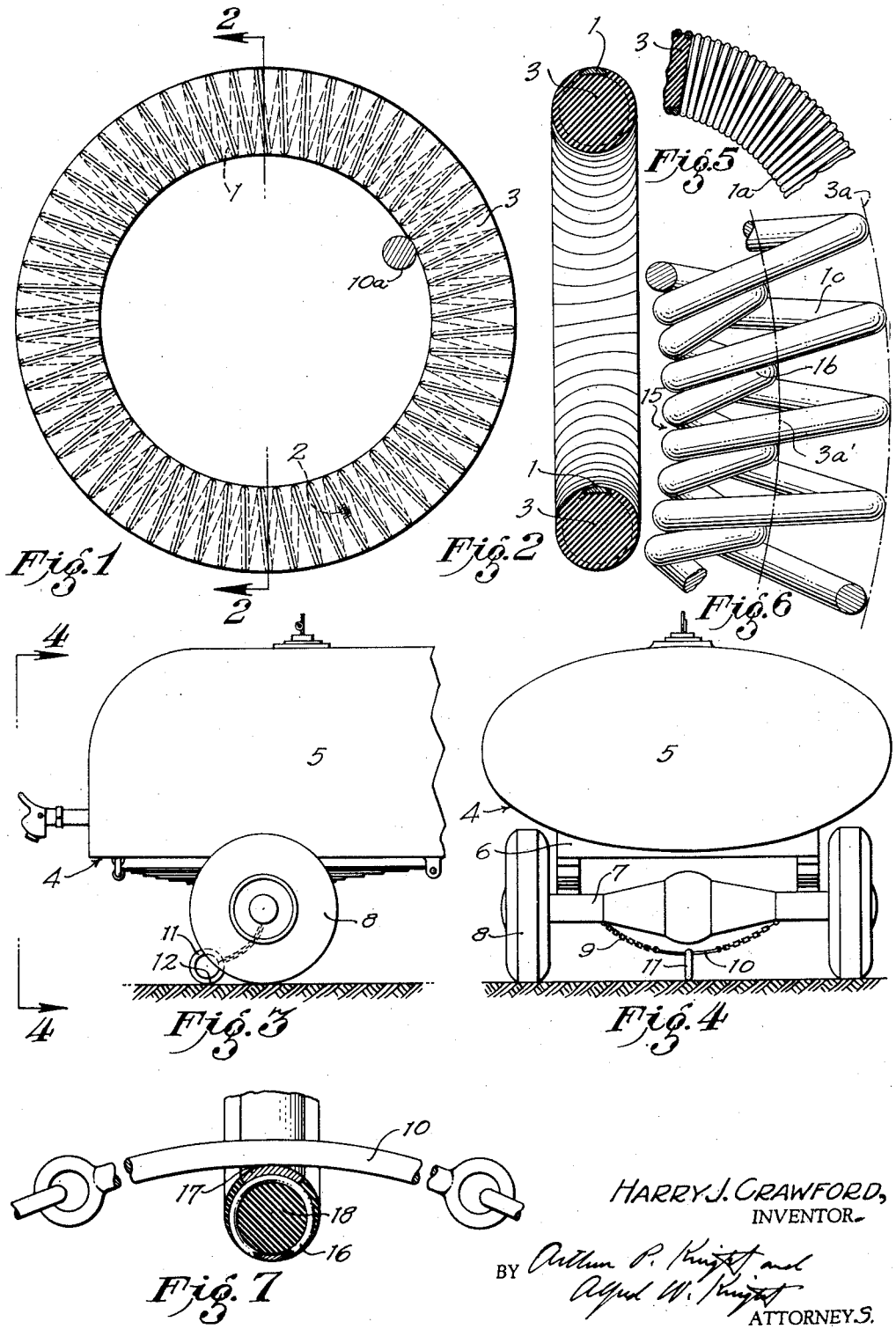

2,216,363

UNITED STATES PATENT OFFICE 2,216,363

STATIC GROUNDING DEVICE FOR VEHICLES

Harry J. Crawford, Venice, Calif.

Application May 31, 1939, Serial No. 276,575

9 Claims. (Cl. 175—264)

This invention relates to grounding devices for dissipating accumulated charges of static electricity generated by a moving vehicle, with particular application to trucks or other vehicles carrying inflammable liquids, and pertains to a device of a substantially non-pyrophoric nature adapted to engage the pavement or ground surface in rolling contact.

One of the particular objects of the invention is to provide a rotatable grounding device of highly resilient and abrasion-resistant character.

A further object of the invention is to provide a rotatable static grounding device having a flexible body of annular shape provided with a plurality of conductor elements extending substantially radially, wherefore electrical connection between the inner and outer peripheries of the annular body is obtained at substantially all points in the circumference.

A further object of the invention is to provide a device of the character described which may be easily and inexpensively manufactured.

A further object is to provide an inexpensive resilient rotatable grounding device having a long useful life.

The device of the present invention comprises, essentially, a metallic conductor element wound in toroidal shape and provided with a resilient core of rubber or comparable material which may be electrically conductive or non-conductive, thus defining a ring in which the toroidally wound conductor provides electrical connection between the inner and outer peripheries of the ring. The ring-shaped grounding device is adapted for connection to the chassis of a vehicle through any suitable flexible connector preferably one anchored at its ends to the chassis and passing through the hollow center of the grounding device, electrical contact from the chassis to ground being secured by sliding contact of the connector with the grounding device at its inner periphery and thus to the ground through the rolling contact of spirally or toroidally wound conductor element at the outer periphery thereof. In certain embodiments the device also comprises a ring-shaped connector member disposed at the inner periphery of the toroidally wound conductor element, in electrical connection therewith throughout the inner periphery, and having an exposed surface directed inwardly into position to be engaged by the connector which is secured to the vehicle chassis. In another embodiment the device comprises two toroidally wound conductor elements in intermeshing engagement with one another at their inner peripheries, in which one conductor element is substantially completely embedded in the resilient core and the other conductor element is incompletely embedded in the core and thus exposed at the inner and outer peripheries of the device to provide the desired electrical conduction between such inner and outer peripheries.

Other objects and features of the invention will be brought out in the ensuing description. Certain embodiments of the invention are illustrated in the accompanying drawing, in which:

Fig. 1 is a side elevation of one form of rotary grounding device;

Fig. 2 is a transverse section thereof taken on line 2—2 in Fig. 1;

Fig. 3 is a fragmentary side elevation of a truck type of vehicle provided with a grounding device according to the invention;

Fig. 4 is a rear view of the truck taken on line 4—4 in Fig. 3;

Fig. 5 is a fragmentary view of a modified form of device, shown in side elevation;

Fig. 6 is a fragmentary view of a compound toroidal conductor assembly, with the resilient core omitted for the purpose of clarity; and Fig. 7 is a fragmentary transverse section of a modified form of rotatable grounding device according to this invention, and further illustrates the method of connecting any of the forms of the invention to the chassis of a vehicle with which it is associated.

Referring particularly to Figs. 1 and 2 of the drawing, the device may comprise a spirally or toroidally wound conductor 1, which may be formed of a single conductor wound spirally as a spring and bent into circular form with its ends joined in any suitable manner as by welding, indicated at 2. The ring formed by the toroidally wound conductor 1 is substantially completely embedded in a core of resilient material 3, such as rubber, which serves to position the respective turns of the torus. The core 3 is preferably not extended beyond the outer periphery of the toroidally wound conductor 1, and may, if desired, be caused to extend to a position just short of the inner and outer peripheries of the conductor 1, so that said conductor is exposed for electrical contact at such inner and outer peripheries.

The core 3 may be of an electrically conductive material, if desired, as by impregnating rubber with graphite, metallic foil, metallic fibres, or the like, in which case the conduction of the static charge through the ring to ground is materially facilitated.

Figs. 3 and 4 illustrate a vehicle 4 comprising a tank truck having a body 5 provided with a frame 6, an axle housing 7, and wheels 8, and the device shown in Figs. 1 and 2 may be employed to provide the desired ground connection for dissipation of accumulated static charges through the agency of a flexible conductor 9 such as a chain, cable, or the like, preferably provided with a center section 10 comprising an elongated rod-like section (shown more particularly in Fig. 7) which extends through the central opening in the device and is adapted to make sliding electrical contact with the conductor 1 at its inner periphery, as shown in section at 10a in Fig. 1. As the vehicle 4 is moved along the pavement, the grounding ring 11 contacts the pavement as at 12 and is caused to rotate much as a small boy rolls a hoop, the element 10 making continuous contact with the inner periphery of the ring and this electrical connection is communicated to the point 12 through the conductor 1. Due to the resilient nature of the core and toroidally wound conductor, the ring 11 in bouncing along the pavement due to irregularities in the surface will strike the pavement with less impact force than would be realized with a comparatively rigid structure such as a metal ring, and the abrasive wear on the conductor 1 is thus considerably diminished. Furthermore, due to the fact that the exterior periphery of the device is made up in part of the core 3, which, when made of rubber or comparable material is of highly abrasion-resistant character, the actual wear on the exposed portions of the conductor 1 will be greatly reduced. In addition, any sparks which result by direct engagement of a portion of the conductor 1 with the ground will be damped to a considerable extent by the surrounding portions of the core which are in substantially concurrent engagement with the abrading surface, and, furthermore, the contact of the device with the ground is for the most part a "rolling" contact, wherefore the production of sparks is eliminated to a great extent. For this reason, while I prefer to form the conductor of a non-pyrophoric material such as bronze or the like, I may form the conductor of steel wire or any other ferrous composition without materially detracting from the non-pyrophoric nature of the construction.

With the form of device shown in Figs. 1 and 2, when the outer periphery has been worn down a radial distance equal to the diameter of the wire forming the toroidally wound conductor 1, such conductor becomes a plurality of independent conductors each extending between the inner and outer peripheries, but actual connection between the point 12 (where the ring engages the ground or pavement) and the position of the connector 10 is lost, wherefore, in this embodiment, I prefer to impart electrical conductivity to the core 3, as by impregnating the core with graphite or other material tending to materially increase conductivity of the rubber or the like of which the core is mainly composed. In this manner, even though the actual resistance of the core material is rather high, effective dissipation of the static charges from the vehicle chassis is secured, in part by electrical conduction through the elements of the conductor 1 and in part through the partially conductive matrix which forms the core 3.

In order to provide substantially continuous electrical connection along the inner periphery of the ring, so that the use of a partially conductive core may be avoided, I may wind the toroidal conductor 1 very compactly, as shown in Fig. 5, so that the several turns of the conductor, indicated at 1a, are in physical contact with one another at the inner periphery, or may provide constructions of the type shown in Figs. 6 and 7. In Fig. 6 two separate toroidally wound conductors 1b and 1c are provided, the conductor 1b being, for purposes of example, wound so as to provide a spring outline of approximately one-half the diameter of that provided by the conductor 1c, the two spiral conductors being wound at the same pitch so that the portions thereof at the inner peripheries will mesh with one another as indicated at 15 and provide continuous electrical contact throughout the inner periphery of the resultant ring. When the conductor construction of the type shown in Fig. 6 is imbedded in the core indicated in dot-dash lines at 3a, the several turns of the conductor 1c will provide the grounding connection until the core has been worn down to the dot-dash line 3a', at which time the several turns of the conductor 1b will also function, and the desired electrical connection will be provided until substantially the entire radial thickness of the resultant ring has been abraded away. Due to the comparatively slight imbedment of the turns of the conductor 1c by the core 3a, the residual portions of the several turns lying inwardly of the dot-dash line 3a' may have a tendency to separate from the core, and be lost from the device, but the electrical grounding characteristics of the ring will be preserved until the thickness of the wire forming the conductor 1b is worn through, at which time the device may be discarded, although the core 3a may be formed of an electrically conductive material, as described in connection with the forms shown in Figs. 1 and 2, if desired, thus preserving the electrical conductivity of the ring as a whole in spite of further wear.

In the form of device shown in Fig. 7, I have provided a toroidally wound conductor 16, which may be of the type shown in Fig. 1 if desired, or augmented by a second conductor of the type shown at 1b in Fig. 6, at the inner periphery of which a conductor ring 17 has been inserted, in electrical contact with the respective turns of the conductor 16, and a matrix or core 18 molded in position surrounding the conductor 16. The ring 17 and the matrix 18 are preferably so shaped that the combined cross-section of the device is substantially circular, whereby uniform contact of the device with the ground and the connector 10 will be obtained. In this form of device the ring 17 will provide the desired electrical connection to the connector 10 throughout the entire life of the device, independent of the wear of the conductor 16 and the conversion thereof into a plurality of separate conductors as described in connection with Figs. 1 and 2.

The formation of the grounding device in a ring shape, with the grounding connector to the frame floating freely within the central opening in the ring, further contributes to the long wear-resisting life of the device, in that the mass of the connector is not imposed upon the ring during small amplitude movements thereof such as may be occasioned by rolling over ununiformities in the supporting surface.

The specific embodiments herein delineated and described are to be considered as illustrative only, and the present invention is to be considered as not limited thereto but rather to the scope of the subjoined claims.

I claim:

1. An annular static-grounding device which comprises: a metallic conductor wound in toroidal shape to form an annulus, and an embedding matrix formed of rubber or similar material formed as an annular ring encompassing said annulus, said metallic conductor being in electrically conductive communication with the inner and outer peripheries of said annular ring.

2. An annular static-grounding device as set forth in claim 1, said metallic conductor being formed of non-pyrophoric metal.

3. An annular static-grounding device as set forth in claim 1, said embedding matrix being electrically conductive.

4. An annular static-grounding device which comprises: a metallic conductor wound in toroidal shape to form an annulus, a second metallic conductor wound in toroidal shape to form an annulus disposed within said first-named annulus, the inner peripheries of the respective annuli substantially coinciding, and an embedding matrix formed of rubber or similar material formed as an annular ring encompassing said annuli, said metallic conductors being in electrically conductive communication with the inner periphery of said annular ring, and said first-named annulus being in electrically conductive communication with the outer periphery of said annular ring.

5. An annular static-grounding device as set forth in claim 4, said metallic conductor being formed of non-pyrophoric metal.

6. An annular static-grounding device as set forth in claim 4, said embedding matrix being electrically conductive.

7. An annular static-grounding device which comprises: a metallic conductor wound in toroidal shape to form an annulus; an annular metallic ring disposed at the inner periphery of said annulus and in electrical contact with said metallic conductor; and an embedding matrix formed of rubber or similar material formed as an annular ring encompassing said annulus, said metallic conductor being in electrically conductive communication with the outer periphery of said annular ring.

8. An annular static-grounding device as set forth in claim 7, said metallic conductor being formed of non-pyrophoric metal.

9. An annular static-grounding device as set forth in claim 7, said metallic ring being curved in cross-section, and the combined cross-section of said ring and said embedding matrix being substantially circular.

HARRY J. CRAWFORD.